United States Patent [19]
Barlow et al.

[11] Patent Number: 4,862,598
[45] Date of Patent: Sep. 5, 1989

[54] QUICK CONNECT/DISCONNECT REPEATABLE SENSOR MOUNTING APPARATUS

[75] Inventors: Neil E. Barlow, Ann Arbor; Robert Dewar, Troy; James K. West, Farmington Hills; Richard Woroniec, West Bloomfield Township, all of Mich.

[73] Assignee: Perceptron, Inc., Farmington Hills, Mich.

[21] Appl. No.: 89,309

[22] Filed: Oct. 1, 1987

[51] Int. Cl.$^4$ .............................................. G01D 11/30
[52] U.S. Cl. ...................................... 33/613; 33/645; 33/626; 33/572
[58] Field of Search ............. 33/143 L, 572, 600, 33/613, 623, 626, 644, 645, 551, 552, 557, 560, 545, 546, 547; 73/966.5; 356/376, 377; 24/500, 505, 507, 509, 517, 519, 521, 522, 523; 269/266, 270

[56] References Cited

U.S. PATENT DOCUMENTS

| | | | |
|---|---|---|---|
| 2,761,217 | 9/1956 | King | 33/645 |
| 4,390,172 | 6/1983 | Gotman | 33/613 |
| 4,473,953 | 10/1984 | Sauvage | 33/546 |
| 4,541,721 | 9/1985 | Dewar | 356/376 |
| 4,554,743 | 11/1985 | Graham et al. | 33/169 R |
| 4,606,129 | 8/1986 | Barrowman et al. | 33/143 L |
| 4,640,014 | 2/1987 | Thomas | 33/143 L |

FOREIGN PATENT DOCUMENTS 3046708  7/1982  Fed. Rep. of Germany ........ 33/572

Primary Examiner—William A. Cuchlinski, Jr.
Assistant Examiner—Patrick R. Scanlon
Attorney, Agent, or Firm—Harness, Dickey & Pierce

[57] ABSTRACT

A quick release mounting arrangement for a portable gauging sensor utilizes three locating surfaces to establish a positive, repeatable mounting for the releasable sensor at any desired number of locations on a gauging fixture. A landing pad at each mounting location provides a depressed cavity in a first face for receipt of a first locating surface carried by the sensor housing, and the landing pad further provides a grooved surface in a second face for receipt of the second and third locating surfaces carried by the sensor body. At least one of the three locating surfaces is movable under spring tension to provide a quick connect/disconnect feature to the sensor mounting arrangement.

9 Claims, 3 Drawing Sheets

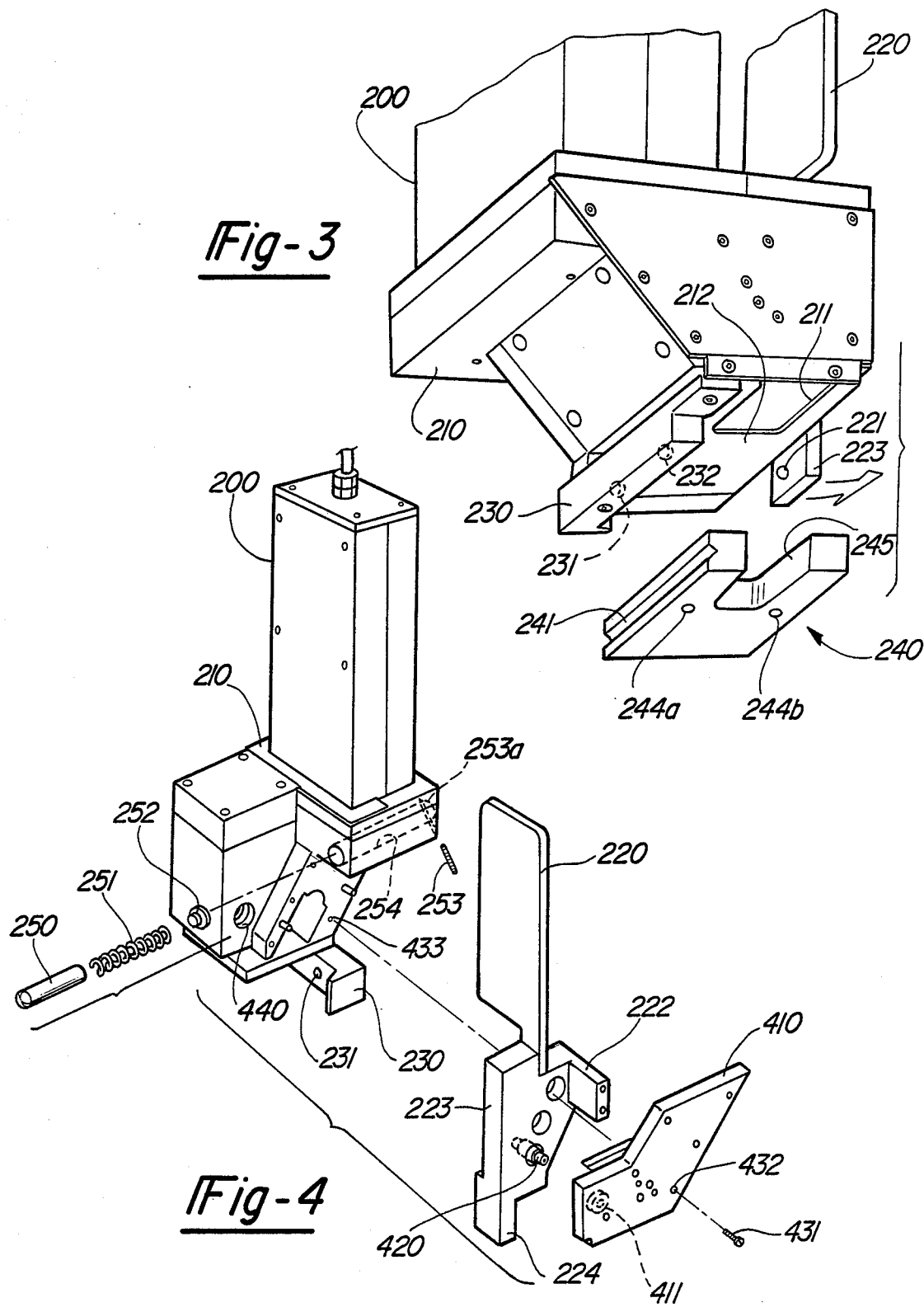

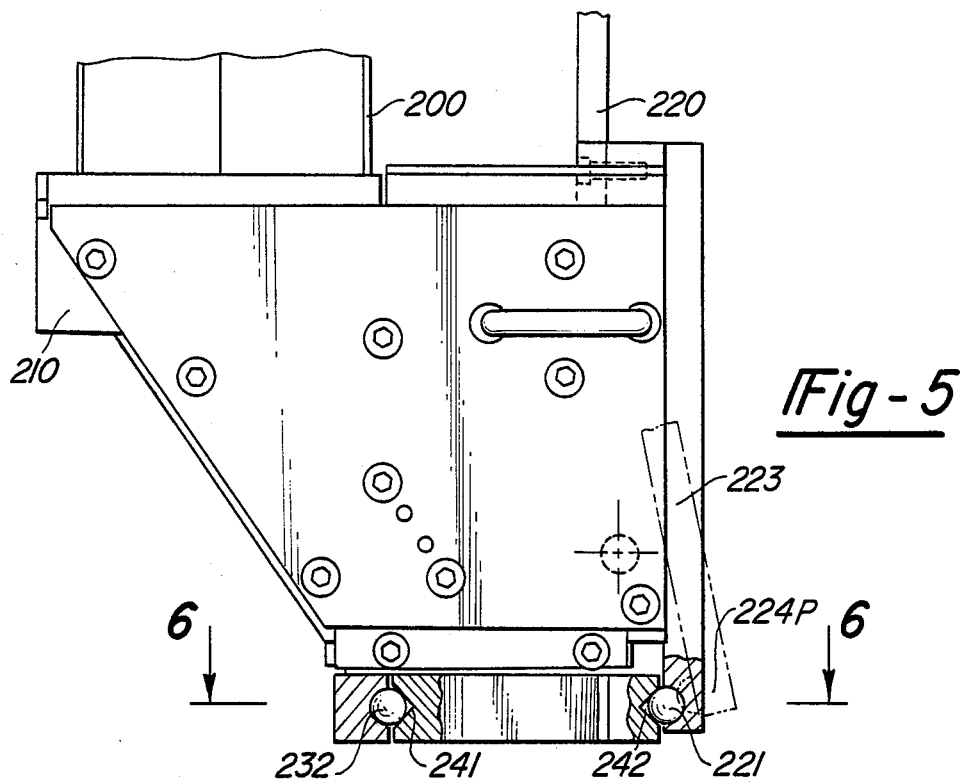
Fig-5
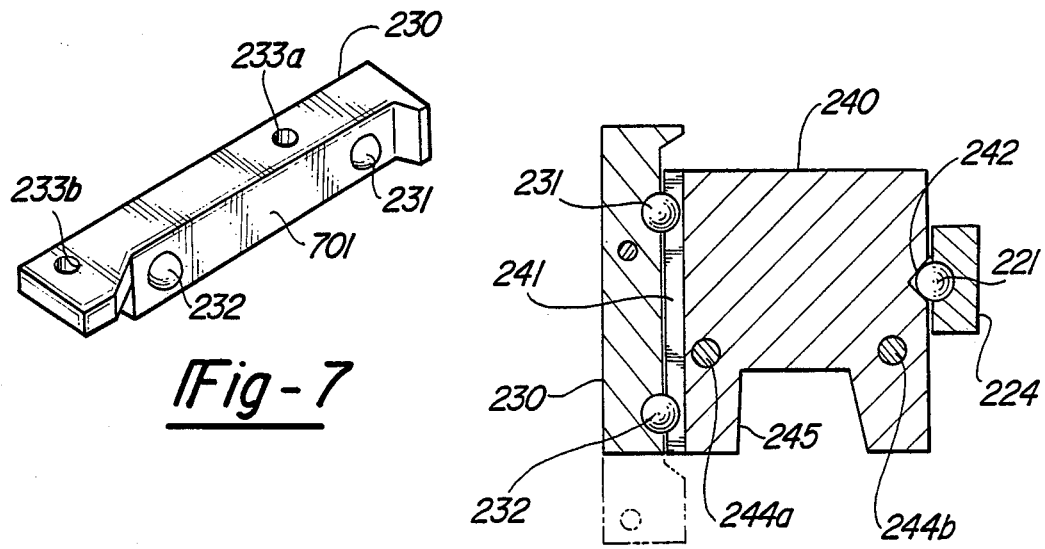
Fig-7
Fig-6

QUICK CONNECT/DISCONNECT REPEATABLE SENSOR MOUNTING APPARATUS

BACKGROUND OF THE INVENTION

The invention relates generally to releasable mounting arrangements for gauging sensors. More particularly, the invention concerns a quick connect/disconnect arrangement for a portable gauging sensor wherein the sensor may be mounted with high mechanical repeatability at any number of positions on a gauging fixture relative to a workpiece to be gauged.

Traditionally, gauging systems for monitoring preselected dimensional characteristics of manufactured workpieces have used customized checking fixtures or ring gauges to measure such dimensional qualities as gap and flush dimensions. The ring surface of such a gauging fixture is machined to precisely reflect the exterior dimensions of a part and its flushness and gap with respect thereto. In operation of such a traditional part inspection system, the actual dimensions of a part have been checked relative to the gauging fixture surface with feeler gauges or vernier calipers. Such tools are conventionally manipulated by a human inspector and are highly subject to human error. In addition, they actually contact the part and fixture ring surface, thereby imparting part deformation or damage and ring surface wear.

Some recently introduced gauging systems now use portable, hand-held sensors to gauge a part held in a relatively simple fixture. Such systems were conceived to permit flexibility of measurements with rapidly changing workpiece designs. Additionally, use of portable gauging sensors, while enabling continued use of existing gauge fixtures already purchased, avoids the need for expensive, precisely toleranced ring surfaces. Rather, with a portable sensor in the newer type of gauging system, all that is required is a plurality of sensor mounting pads or "landing pads" precisely positioned at various points on the somewhat cruder fixture at key measurement positions relative to the part to be gauged.

A known example of such a gauging system utilizing a hand-held, portable gauging sensor is disclosed in U.S. Pat. No. 4,640,014 to Thomas. Thomas teaches a hand-held, portable sensor with two contact-type probes and associated transducers for measuring gap and flush at predetermined points about the periphery of a workpiece to be gauged. To locate the portable sensor at the predetermined points about the gauging fixture surface, Thomas teaches the use of a pin projecting from the sensor housing which mates with a bore provided in a channel of the locating block holding the sensor housing.

As is known in the pertinent art, to mechanically restrain a rigid object in three translational axes and three rotations about those axes, it is necessary and sufficient to fix three points along one translational axis, two points along a second orthogonal axis and one additional point along a third axis, all three axes being mutually orthogonal. Hence, it will be seen that the sensor mounting arrangement disclosed by the Thomas patent is spatially overconstrained. The chamfers running along two sides of both the sensor housing and its landing pad each constrain the mating of the two devices in first and second orthogonal axes. Assuming these four mating surfaces are both machined and ground flat, then two points of contact will be created on both sides of the chamfered channel. This aspect of the Thomas disclosed approach would require a high level of expensive metal working precision to allow these four surfaces to properly mate. Additionally, the pin/bore combination constrains the mating along a third orthogonal axis as well. The placement of the pin and bore relative to the mating channels would also require a high level of machining precision. This is due to the fact that there are three unnecessary points of contact along one axis and one unnecessary point of contact along another.

Mechanical repeatability, which is the measure of how well the sensor performs when it is mounted and remounted upon the same mounting or landing pad with the same part and position, is somewhat compromised in the Thomas disclosure. The repeatability of the pin/bore mating arrangement is limited by "slip fit" requirements. Machining/grinding practices dictate that at least 0.001-0.002 inches of clearance be kept between the inside diameter of the bore and the outside diameter of the mating pin. This results in a minimum positioning uncertainty of 25 to 50 microns. In addition, this level of "slip fit" is very tight, subject to binding, and requires the operator to carefully insure that the axes of the pin and bore are precisely aligned prior to mating. Additionally, repeated insertions and removals will impart significant wear to both the pin and bore over time, resulting in degraded repeatablilty.

Finally, in approaches such as taught in the Thomas patent, the operator must have a steady hand and be capable of exerting a constant pressure on the sensor during the measurement cycle. This is not only ergonomically unpleasing from the standpoint of operator fatigue, but also implies that the operator is critically linked to the quality of the measurements.

In many circumstances, it has been found desirable to use a non-contact optical sensor as a portable measurement device for movement from check point to check point about the periphery of the workpiece being gauged. Such a truly portable vision sensor would allow measurements such as gap and flushness to be acquired without contacting either the workpiece or the ring surface of the gauging fixture thus eliminating problems of deformation, damage, and wear caused by contact with sensor elements. However, whether the gauging system utilizes contact or non-contact probe elements, the need for an improved repeatable mounting arrangement for the portable sensor at any of the landing pads mounted to the gauging fixture is required.

SUMMARY OF THE INVENTION

Accordingly, it is an object of this invention to provide an improved arrangement for repeatably mounting, in an accurately defined, stable rest position, a portable gauging sensor not requiring continued "hands-on" contact by an operator during gauging.

The invention provides a gauging sensor housing mounting position defined by the mating engagement of three protruding locating surfaces with a grooved surface and a non-elongate crater-like depression. Two of the locating surfaces engage the grooved surface, while the third locating surface engages the depression in the stable mounted condition. The locating surfaces may protrude either from the sensor housing or from the landing pad, with the mating groove or depression formed in the opposite member. At least one locating surface is relatively moveable with respect to its corresponding groove or depression to enabale quick connection and disconnection of the sensor housing with the landing or mounting pad.

It is a feature of this invention that the mounting position, defined by a three point mating relationship between locating surfaces and respective groove and depression, offers high mechanical repeatability with precise positioning in all six conventional degrees of freedom.

BRIEF DESCRIPTION OF THE DRAWING

These and other objects and features of the invention will become apparent from a reading of a detailed description of a preferred embodiment, taken in conjunction with the drawing, in which:

FIG. 3 is another perspective view from below the gauging fixture of the gauging sensor housing and associated landing pad;

FIG. 4 is a partially exploded perspective view of the gauging sensor housing depicting mounting details of a mounting release lever arm;

FIG. 5 is a partial cross-sectional side plan view of a portion of the gauging sensor housing coupled to a landing pad;

FIG. 6 is a cross-sectional view taken along Section 6—6 of FIG. 5; and

FIG. 7 is a perspective view of a locator block carried by the gauging sensor housing.

DETAILED DESCRIPTION

Figure 1:
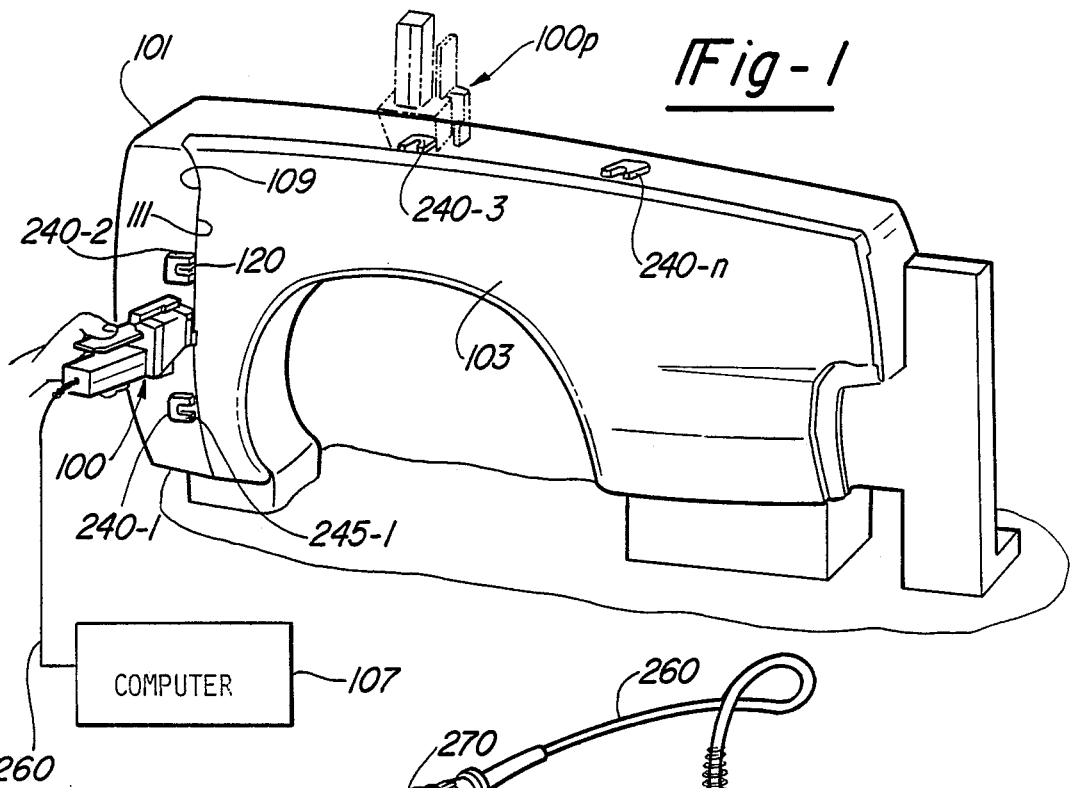
FIG. 1 is a perspective view of a workpiece held in a gauging fixture and depicting the use of a portable gauging sensor and associated landing pads designed in accordance with the principles of the invention.
Figure 2:
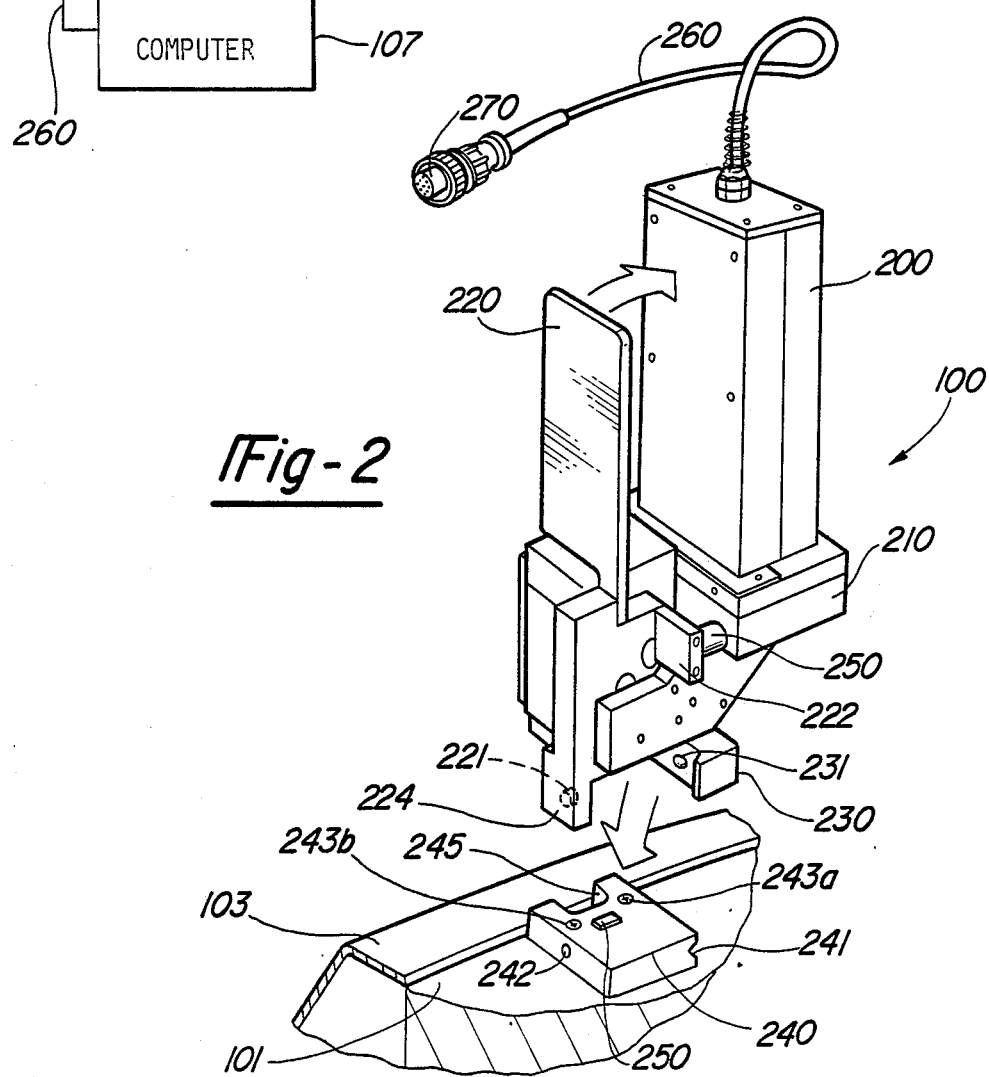
FIG. 2 is a perspective view from above the gauging fixture and workpiece of the gauging sensor housing and associated landing pad.

With respect to the drawing, it is to be understood that the same component or feature will bear the same reference designation in all the figures.

Referring to FIG. 1, a non-contact gauging system for a workpiece 103 to be checked or gauged is set forth. As seen from FIG. 1, the workpiece 103, which could be a stamping such as an automobile fender part, is placed in a suitable ring gauging fixture 101 and clamped on net surfaces. A plurality of mounting or landing pads 240-1. 240-2, 240-3 through 240-n are mounted about the periphery of the gauging fixture at preselected locations near a surface of the workpiece 103 to be gauged. These landing pads are used to detachably, yet repeatedly, mount a hand-held, portable sensor 100 used to measure the workpiece gap and flushness as measured along the boundary of edge 111 of workpiece 103 and edge 109 of the gauge fixture 101. Portable gauge 100 is shown in phantom at landing pad 240-3 to demonstrate the portability of the unit in taking various sequential measurements about the periphery of workpiece 103. Sensor unit 100 in the preferred embodiment comprises an optical triangulation-type sensor such as disclosed in U.s. Pat. No. 4,645,348 to Dewar et. al. and assigned to the same assignee as this invention.

Gauge sensor 100 is coupled by a data communications cable 260 to a computer-based gauge system controller unit 107, which also may be portable.

Each landing pad 240 includes a substantially U-shaped cavity 245 opening towards the workpiece 103. These openings 245 are gauging access slots which enable the optics within unit 100 to be directed towards the juncture of the gauge fixture reference surface 109 and edge 111 of workpiece 103. Additionally, gauging access slots 245 surround a surface 120 of the gauge fixture which can carry optically sensed indicia of the identity of the landing pad. For example, the surfaces 120 surrounded by the gauging access slots 245 could bear an optically readable bar code to identify the location of the landing pad to gauge system controller 107.

With reference to FIGS. 2-6, various views are shown of a gauge sensor housing and associated landing pad designed in accordance with the principles of the invention. Portable sensor unit 100 includes an electronics housing 200 coupled to an optics head or housing 210. Housings 200 and 210 could typically include the components described in the above-referenced U.S. Pat. No. 4,645,348. Electronics housing 200 is additionally coupled by a suitable adaptor to a data communications cable 260 carrying a multi-plug connector 270 at its remote end for coupling to a suitable control unit, such as the computer based controller 107 of FIG. 1.

A release actuating lever 223 carries an actuating paddle 220 at one end and a ball carrier portion 224 at another end. Press fit into the planar surface of ball carrier portion 224 facing inwardly of the general periphery of the sensor 100 is a substantially spherical locator ball 221. The actuating lever 223 is pivotally mounted to the optics head 210 via pivot pin 420, one end of which engages a threaded hole 440 in housing 210. The other end of the pivot pin 420 is captured in a countersunk receiving bore 411 formed in retaining flange 410 which is coupled via threaded screws 431 passing through screw receiving bores 432 in flange 410 and thence into threaded holes 433 in housing 210. Extending from release lever 223 at a point spaced from the pivot point carrying pivot pin 420 is a bearing flange 222 which abuts an end of a spring loaded plunger 250. Absent a counteracting force being applied (e.g., by hand) to actuate paddle 220, plunger 250 maintains release lever 223 and its ball carrier portion 224 in a predefined rest position by the spring force exerted normal to bearing flange 222. Plunger 250 is suitably coupled to one end of spring 251. The other end of spring 251 is retained by a spring retaining cap 252. The plunger-spring combination is retained in a receiving bore 254 in housing 210 via a threaded retaining pin 253 engaging a threaded hole 253a in housing 210. With lever 223 arranged as shown, when a force is applied to paddle 220 in the direction of the arrow shown in FIG. 2, ball carrier portion 221 will swing outwardly of the gauging sensor housing (see the phantom position 224P of lever 223 in FIG. 5).

Coupled to mounting surface 212 of the sensor housing (see FIG. 3) is a ball locator block 230 carrying two press fit substantially spherical balls 231 and 232 protruding from a surface 701 (see FIG. 7) which is substantially normal to sensor mounting surface 212. Ball locator block 230 includes two mounting holes 233a and 233b (see FIG. 7) for receipt of coupling screws passing therethrough and fixing block 230 to the underside of optics head 210 on surface 212. Optics access port 211 is formed in surface 212 of optics head 210 to enable the optics to pass and receive optical information from a target. Port 211 may be covered with a suitable transparent medium. As shown, locating surfaces of balls 231 and 232 face locating ball 221 across surface 212.

Each mounting or landing pad 240 is coupled to gauging fixture 101 via mounting screws 243a and 243b passing through respective mounting holes 244a and 244b extending normally to the substantially rectangular mounting surface of landing pad 240. Extending along a side surface of landing pad 240 is a substantially V-shaped groove 241. Formed in an opposite and parallel side surface of landing pad 240 is a depression 242 of substantially conical cross-section.

Mounted at a suitable location at a surface of the landing pad 240 facing the mounting surface 212 of the sensor housing is a magnet or other suitable triggering device 250 for actuating a switch as a relay unit (not shown) in optics head 210. Such relay actuation could be used as a signal to the gauging system that the sensor housing and landing pad have been properly engaged in the proper relative position to begin optical sensing of the workpiece 103 with respect to the selected reference surface of gauging fixture 101. Each landing pad 240 additionally includes, as mentioned above, a gauging access slot 245 which may surround an area of gauging fixture 101 bearing identification indicia such as optically readable bar codes.

As seen from the various figures of the drawing, the repeatable and stable mounting position is precisely defined in all dimensions by the engagement of locator balls 231 and 232 in V-groove 241 and the simultaneous engagement between ball 221 and conical depression 242. To mount the sensor housing to a selected landing pad, the operator grasps the housing and release actuator paddle 220 and squeezes the paddle 220 in the direction of the arrow shown in FIG. 2 towards electronics housing 200. By this motion, the ball carrier portion 224 of release lever 223 swings outwardly of the housing and enables the operator to slide locator balls 231 and 232 into V-groove 241 of the landing pad while maintaining clearance for ball 221 on the other side of the landing pad. At any chosen point, the operator may release the actuating paddle 220 whereupon plunger 250 via spring 251 will bear against bearing flange 222 to pivot the release lever 223 towards its normal rest position. At this point, the housing may be slid along groove 241 until the protruding surface of ball 221 snaps into conical depression 242 thereby setting the probe housing and landing pad mounting relationship in a stable manner, while enabling the operator (or machine) to release the probe housing for hands-free gauging. It will be appreciated by those skilled in the art that the three positions of contact between sensor housing and mounting or landing pad will define a stable rest position repeatably obtained to a high degree in all six degrees of freedom.

The two loacator balls 231 and 232 engaging V-groove 241 of landing pad 240 provides simultaneous constraint at two points along first and second orthogonal axes. Ball 221 engaging conical depression 242 provides simultaneous constraint along both the first axis and a third mutually orthogonal axis at one point. Thus, three points are constrained along the first axis, two along the second axis, and one point along the third axis, thereby fulfilling the requirements for mechanical constraint of a rigid object in six degrees of freedom.

Landing pad 240 of the invention is inherently less costly to manufacture when compared to arrangements of the prior art, since only the V-groove 241 requires both machining and grinding, while the conical depression 242 is machined in a relatively simple manner. Additionally, the position of the conical hole or depression 242 is only mildly critical in light of the translational freedom provided along the axis of groove 241.

Tests of a mounting arrangement designed in accordance with the principles of the invention have demonstrated mechanical repeatability to within the order of 10 microns.

The invention has been described with reference to a detailed description of a preferred embodiment. It is to be understood that such detail has been set forth for the purpose of example only and is not intended to limit the scope and spirit of the invention, which is defined in the appended claims. For example, the invention includes reversing or alternating the positions of the spherical locating surfaces and their respective mating receiving surfaces. The landing pad could carry the V-groove while the gauging sensor housing could carry the conical depression, or vice versa.

We claim:

1. A gauging system for determining dimensional characteristics of a workpiece including a gauging sensor located within a housing, a gauging fixture for supporting the workpiece and an apparatus for releasably mounting the gauging sensor housing to a predetermined location on the gauging fixture comprising:
   mounting means coupled to the gauging fixture at the predetermined location;
   first, second and third substantially spherical locating surfaces protruding from one of the gauging sensor housing and the mounting means;
   an elongate receiving surface on the other one of the sensor housing and the mounting means shaped for slideable receipt of the first and second locating surfaces;
   a non-elongate receiving surface on the other one of the sensor housing and the mounting means shaped for substantially non-sliding receipt of the third locating surface; and
   means for relatively moving at least one of the locating surfaces with respect to its mating receiving surface so as to enable connection and disconnection of the sensor housing from the mounting means;
   wherein engagement of the first and second locating surfaces in the elongated receiving surface establishes two and only two points of constraint simultaneously along first and second orthogonal axes of the mounting means and wherein engagement of the third locating surface in the non-elongate receiving surface establishes one and only one point of constraint simultaneously along the first axis and a third mutually orthogonal axis of the mounting means.

2. The gauging system of claim 1 wherein the elongate receiving surface is substantially V-shaped and wherein the non-elongate receiving surface is substantially conical.

3. The gauging system of claim 1 wherein the means for relatively moving comprises a surface carrier pivotally mounted to one of the sensor housing and the mounting means.

4. A gauging system for determining dimensional characteristics of a workpiece including a portable gauging sensor located in a housing, a gauging fixture for supporting the workpiece, and means for releasably mounting the housing for the gauging sensor at a predetermined location on the gauging fixture comprising:
   a landing pad coupled to the gauging fixture at the predetermined location and including a groove of substantially V-shaped cross-section extending along a first surface of the landing pad and a conical depression formed in a second surface of the landing pad;

first carrier means fixedly coupled to the gauging sensor housing for mounting first and second substantially spherical locating surfaces protruding from the carrier means and positioned for sliding receipt in the landing pad groove; and movable second carrier means pivotally coupled to the housing and mounting a third substantially spherical protruding locating surface positioned relative to the first and second locating surfaces such that the third locating surface will matingly engage the conical depression whenever the first and second locating surfaces are slid to predetermined positions in the groove.

5. The gauging system of claim 4 further comprising an actuating lever arm coupled to the second carrier means and means for urging the third locating surface into mating engagement with the conical depression whenever no force is applied to the lever arm.

6. The gauging system of claim 5 wherein the means for urging comprises a spring-biased plunger engaging a bearing surface of the actuating lever arm, the plunger operable to return the third locating surface to a predetermined position relative to the first and second locating surfaces whenever force is removed from the actuating lever arm.

7. The gauging system of claim 4 wherein engagement of the V-shaped groove by the first and second spherical locating surfaces establishes two and only two points of constraint simultaneously along first and second orthogonal axes of the landing pad and wherein engagement of the third spherical locating surface in the conical depression establishes one and only one point of constraint simultaneously along the first axis and a third mutually orthogonal axis of the landing pad.

8. A gauging system for determining dimensional characteristics of a workpiece including a hand-held, portable gauging sensor located in a housing, a gauging fixture for supporting the workpiece, and apparatus for releasably and repeatably coupling the gauging sensor housing to the gauging fixture at any of a plurality of predetermined locations on the gauging fixture comprising:

a landing pad mounted at each of the predetermined locations, each pad having a substantially rectangular mounting surface abutting the gauging fixture, a substantially V-shaped groove extending along a first side surface of the pad which is substantially normal to the plane of the rectangular mounting surface, and a substantially conical cavity formed in a second side surface of the pad which is parallel to the first side surface;

a sensor mounting surface on the gauging sensor housing positioned and shaped to abut a top surface of the landing pad;

a locator block coupled to the sensor mounting surface and having first and second substantially spherical locating surfaces protruding from a planar surface extending normal to the plane of the sensor mounting surface;

an actuating lever arm pivotally coupled to the gauging sensor housing about an axis parallel to the plane of the sensor mounting surface, with a third substantially spherical locating surface protruding from a first end surface of the lever arm facing the locating block planar surface carrying the first and second locating surfaces, the first end surface lying in a plane substantially parallel to the locator block planar surface in a non-actuated state whenever no force is applied to an opposite end of the lever arm and the first surface moving outwardly from the sensor housing thereby moving the third locating surface away from the first and second locating surfaces in an actuated state whenever force is applied to the opposite end of the lever arm; and the three locating surfaces and the sensor mounting surface relatively positioned such that in a stable and repeatable rest position with the lever arm in the non-actuated state, the sensor mounting surface abuts the top surface of the landing pad, while the first and second locating surfaces engage the V-shaped groove and the third locating surface engages the conical cavity.

9. The gauging system of claim 8 wherein engagement of the V-shaped groove by the first and second spherical locating surfaces establishing two and only two points of constraint simultaneously along first and second orthogonal axes of the landing pad and wherein engagement of the third spherical locating surface in the conical cavity establishes one and only one point of constraint simultaneously along the first axis and a third mutually orthogonal axis of the landing pad.

* * * * *